United States Patent
Jeon et al.

(10) Patent No.: US 9,196,386 B2
(45) Date of Patent: Nov. 24, 2015

(54) SPACER GRID FOR NUCLEAR FUEL ASSEMBLY FOR REDUCING HIGH FREQUENCY VIBRATION

(71) Applicant: KEPCO NUCLEAR FUEL CO., LTD., Daejeon (KR)

(72) Inventors: Sang Youn Jeon, Daejeon (KR); Jung Min Suh, Daejeon (KR); Kyong Bo Eom, Daejeon (KR); Joon Kyoo Park, Daejeon (KR); Dong Geun Ha, Daejeon (KR); Jin Sun Kim, Daejeon (KR); Seong Soo Kim, Daejeon (KR); Joo Young Ryu, Daejeon (KR); Oh Joon Kwon, Seoul (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 215 days.

(21) Appl. No.: 13/648,322

(22) Filed: Oct. 10, 2012

(65) Prior Publication Data
US 2014/0037041 A1 Feb. 6, 2014

(30) Foreign Application Priority Data
Aug. 6, 2012 (KR) .................. 10-2012-0085971

(51) Int. Cl.
*G21C 3/356* (2006.01)
*G21C 3/322* (2006.01)
*G21C 3/34* (2006.01)

(52) U.S. Cl.
CPC ................ *G21C 3/356* (2013.01); *G21C 3/322* (2013.01); *G21C 3/3563* (2013.01); *G21C 2003/3432* (2013.01); *Y02E 30/38* (2013.01)

(58) Field of Classification Search
CPC ........ G21C 3/34; G21C 3/356; G21C 3/3563; G21C 3/3566; G21C 2003/3432; G21C 3/3408; G21C 3/3416; G21C 3/352
USPC .......................................................... 376/442
See application file for complete search history.

(56) References Cited

U.S. PATENT DOCUMENTS

| | | | | |
|---|---|---|---|---|
| 3,255,091 A | * | 6/1966 | Frisch ........................... | 376/441 |
| 3,715,275 A | * | 2/1973 | Krawiec ........................ | 376/442 |
| 4,265,708 A | * | 5/1981 | Lawrence ..................... | 376/352 |
| 4,957,697 A | * | 9/1990 | Wada ............................ | 376/442 |
| 5,158,162 A | * | 10/1992 | Fink et al. ..................... | 188/378 |
| 5,167,911 A | * | 12/1992 | Fujimura et al. .............. | 376/440 |
| 5,265,140 A | | 11/1993 | Perrotti | |

(Continued)

FOREIGN PATENT DOCUMENTS

| | | |
|---|---|---|
| DE | 199 16 893 C1 | 10/2000 |
| JP | 02-102487 A | 4/1990 |

(Continued)

*Primary Examiner* — Jack W Keith
*Assistant Examiner* — Sharon M Davis
(74) *Attorney, Agent, or Firm* — Rabin & Berdo, P.C.

(57) ABSTRACT

Disclosed herein is a spacer grid for a nuclear fuel assembly which is formed from grid strips of an improved structure, thus reducing flow-induced high-frequency vibration. The spacer grid has dimples or grid springs for supporting fuel rods and is formed from a plurality of grid strips assembled in a lattice shape to form lattice cells. Each of the grid strips has at least one slot formed in a planar portion of the grid strip separately from the dimple or grid spring. Therefore, characteristics of the vibration of the spacer grid can be set in a variety of different manners so that flow-induced high-frequency vibration can be reduced.

8 Claims, 9 Drawing Sheets

(56) References Cited

U.S. PATENT DOCUMENTS

| | | | |
|---|---|---|---|
| 5,331,678 A * | 7/1994 | Hatfield et al. | 376/442 |
| 6,473,482 B1 * | 10/2002 | Steinke | 376/442 |
| 2010/0128835 A1 * | 5/2010 | Yoon et al. | 376/426 |
| 2010/0246748 A1 | 9/2010 | Lewis et al. | |
| 2010/0310034 A1 * | 12/2010 | Jiang et al. | 376/442 |
| 2011/0200160 A1 | 8/2011 | Evans et al. | |

FOREIGN PATENT DOCUMENTS

| | | |
|---|---|---|
| JP | 10-058185 A | 3/1998 |
| KR | 10-2007-0085563 A | 8/2007 |
| KR | 10-0932436 B1 | 12/2009 |

* cited by examiner

SPACER GRID FOR NUCLEAR FUEL ASSEMBLY FOR REDUCING HIGH FREQUENCY VIBRATION

BACKGROUND OF THE INVENTION

1. Field of the Invention

The present invention relates generally to spacer grids for nuclear fuel assemblies and, more particularly, to a spacer grid for a nuclear fuel assembly which is formed from grid strips of an improved structure, thus reducing flow-induced high-frequency vibration.

2. Description of the Related Art

A nuclear reactor refers to a device that is designed to exert artificial control over the chain reaction of the nuclear fission of fissile materials and use thermal energy generated from the nuclear fission as power.

Generally, nuclear fuel that is used in a nuclear reactor is formed in such a way that enriched uranium is molded into a cylindrical pellet of a predetermined size and many pellets are inserted into fuel rods. The fuel rods constitute a nuclear fuel assembly. The nuclear fuel assembly is loaded in a core of the nuclear reactor before it is burned up in a nuclear reaction.

Referring to FIG. 1, a typical nuclear fuel assembly includes a plurality of fuel rods 10 which are located in an axial direction, a plurality of spacer grids 20 which are provided in a transverse direction of the fuel rods 10 and support the fuel rods 10, a plurality of guide thimbles 30 which are fixed to the spacer grid 20 and form a framework of the assembly, and a top nozzle 40 and a bottom nozzle 50 which respectively support upper and lower ends of the guide thimbles 30.

About 200 or more fuel rods 10 are used to form the nuclear fuel assembly. Enriched uranium is molded into a pellet of a predetermined size and installed in each fuel rod 10.

The top nozzle 40 and the bottom nozzle 50 support the upper and lower ends of the guide thimbles 30. The top nozzle 40 is provided with elastic bodies to push down an upper end of the nuclear fuel assembly, thus preventing the pressure of a coolant flowing from a lower end of the nuclear fuel assembly towards the upper end thereof from lifting up the nuclear fuel assembly. The bottom nozzle 50 supports the lower ends of the guide thimbles 30. A plurality of flow holes through which the coolant is supplied into the nuclear fuel assembly are formed in the bottom nozzle 50.

The several spacer grids 20 are arranged at predetermined intervals with respect to the axial direction of the fuel rods 10. According to the arrangement location and function, the spacer grids 20 are classified into medial spacer grids, mixing spacer grids which enhance the performance of mixing the coolant, and a protective spacer grid which filters out foreign substances.

Referring to FIG. 2, the spacer grids are commonly formed by a plurality of grid strips assembled in a lattice shape. In each spacer grid, a single fuel rod or guide thimble is disposed in each of the lattice cells.

In detail, the spacer grid 20 includes a plurality of an outer grid strip 21 which forms an outer frame of a structure, and horizontal grid strips 22 and vertical grid strips 23 which are arranged and fixed inside the outer grid strip 21 and form a lattice shape.

The fuel rods are disposed in the corresponding lattice cells 20a formed in the spacer grid 20 having the above-mentioned construction. Further, guide thimble lattice cells 20b into which the guide thimbles are inserted are formed in the spacer grid 20.

The fuel rods are assembled with the spacer grid in such a way that dimples and grid springs are provided on the grid strips that form the lattice cells so that the grid strips elastically support the fuel rods. Each guide thimble may be welded to the spacer grid or may be mechanically fixed thereto by a sleeve.

FIG. 3 is a perspective view illustrating a protective spacer grid according to a conventional technique. Only one of lattice cells formed from a plurality of grid strips is shown in this drawing.

Referring to FIG. 3, the typical spacer grid 20 includes horizontal grid strips 22 and vertical grid strips 23 which are crisscrossed and adhered to each other to form a lattice shape, thus forming lattice cells. One fuel rod is disposed in one lattice cell. Each fuel rod is supported in the corresponding lattice cell by dimples 24 which are made by bending or curving portions of the grid strips 23 and protrude from the surfaces of the grid strips 23. A grid spring may be provided to elastically support the fuel rod along with the dimples, although it is not shown in the drawing.

As such, each grid strip generally has a planar surface. The dimples or grid springs are provided to be bent or curved from the planar surface of the grid strips inwards or outwards with respect to the lattice cell. The surfaces of the grid strips that are disposed above and below the dimples and the grid springs are formed to be planar without having any specific structure.

Recently, the structure of a spacer grid which can improve the flow of a coolant that passes around fuel rods is required, for example, in such a way that mixing blades are attached to the spacer grid or the structure of a flow channel of the coolant is improved, thus making it more efficient to transfer heat from the fuel rods to the coolant.

However, such methods for promoting heat transfer may cause flow-induced vibration which creates greater turbulence in the coolant that flows around the fuel rods, thus vibrating the fuel rods.

The flow-induced vibration of the fuel rods causes the fuel rods to slip out of the grid spring or dimples, causing a fretting phenomenon in which partial abrasion occurs on the contact surface between the fuel rods and the grid spring or dimples, thus gradually damaging the fuel rods.

For example, a spacer grid for preventing the fretting of fuel rods was proposed in Korean Patent Registration No. 10-0932436 (date: Dec. 9, 2009), which improves a contact structure between the fuel rods and the grid springs to prevent flow-induced vibration from causing axial or lateral vibration of the fuel rods.

As such, different kinds of means for reducing flow-induced vibration of the coolant in the spacer grid of the nuclear fuel assembly have been devised. The present invention is to provide a structure of a spacer grid that can reduce flow-induced vibration.

SUMMARY OF THE INVENTION

Accordingly, the present invention has been made keeping in mind the above problems occurring in the prior art, and an object of the present invention is to provide a spacer grid for a nuclear fuel assembly that is configured to reduce the vibration which may be caused by a coolant and, in particular, to provide a spacer grid for a nuclear fuel assembly which can reduce high frequency vibration by using a simply improved structure of the surface of the grid regardless of a grid spring or dimple structure.

In order to accomplish the above object, the present invention provides a spacer grid for a nuclear fuel assembly having a dimple or grid spring for supporting a fuel rod, the spacer grid including a plurality of grid strips assembled in a lattice shape to form lattice cells, each of the grid strip having at least one slot formed in a planar portion of the grid strip separately from the dimple or grid spring.

The slot may have a curved or bent pattern extending in a lateral direction of the grid strip.

The slot may comprise two or more slots arranged at upper and lower positions, the slots having a same curved or bent pattern extending in a lateral direction of the grid strip.

The slot may comprise two or more slots arranged at upper and lower positions, the slots having different curved or bent patterns extending in a lateral direction of the grid strip.

The slot may comprise two or more slots arranged to be vertically symmetrical.

The slot may be formed in each of upper and lower portions of the grid strip based on the dimple or grid spring.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The invention now will be described more fully hereinafter with reference to the accompanying drawings, in which various embodiments are shown. Specific structures or a functional description described in the embodiments are given only to explain the embodiments according to the concept of the present invention. This invention may be embodied in many different forms, and should not be construed as being limited to the embodiments set forth herein. All possible modifications, additions and substitutions must be considered as falling within the scope and spirit of the invention.

It will be understood that, although the terms first, second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. On the other hand, it should be understood that when an element is referred to as being "directly coupled" or "directly connected" to another element, there are no intervening elements present. Other expressions for describing a relationship between elements, e.g. "between" and "directly between" or "adjacent to" and "directly adjacent to", must also be construed in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, a preferred embodiment of the present invention will be explained in detail with reference to the attached drawings.

Figure 1:
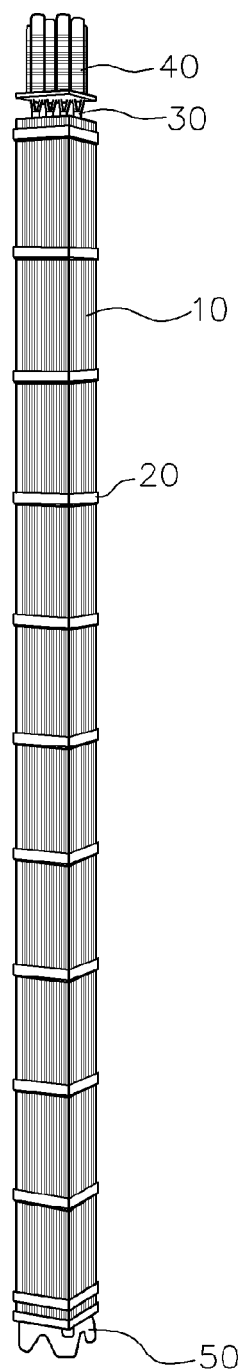
FIG. 1 is a view illustrating a typical nuclear fuel assembly.
Figure 2:
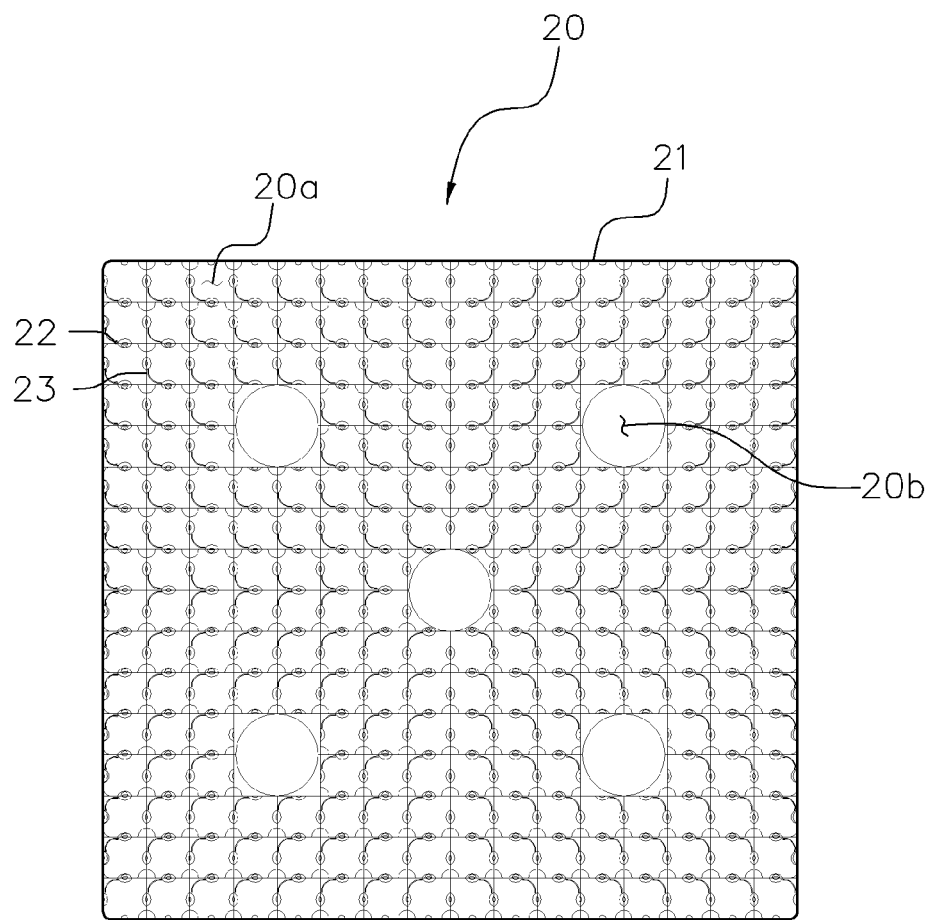
FIG. 2 is a plan view of a typical spacer grid.
Figure 3:
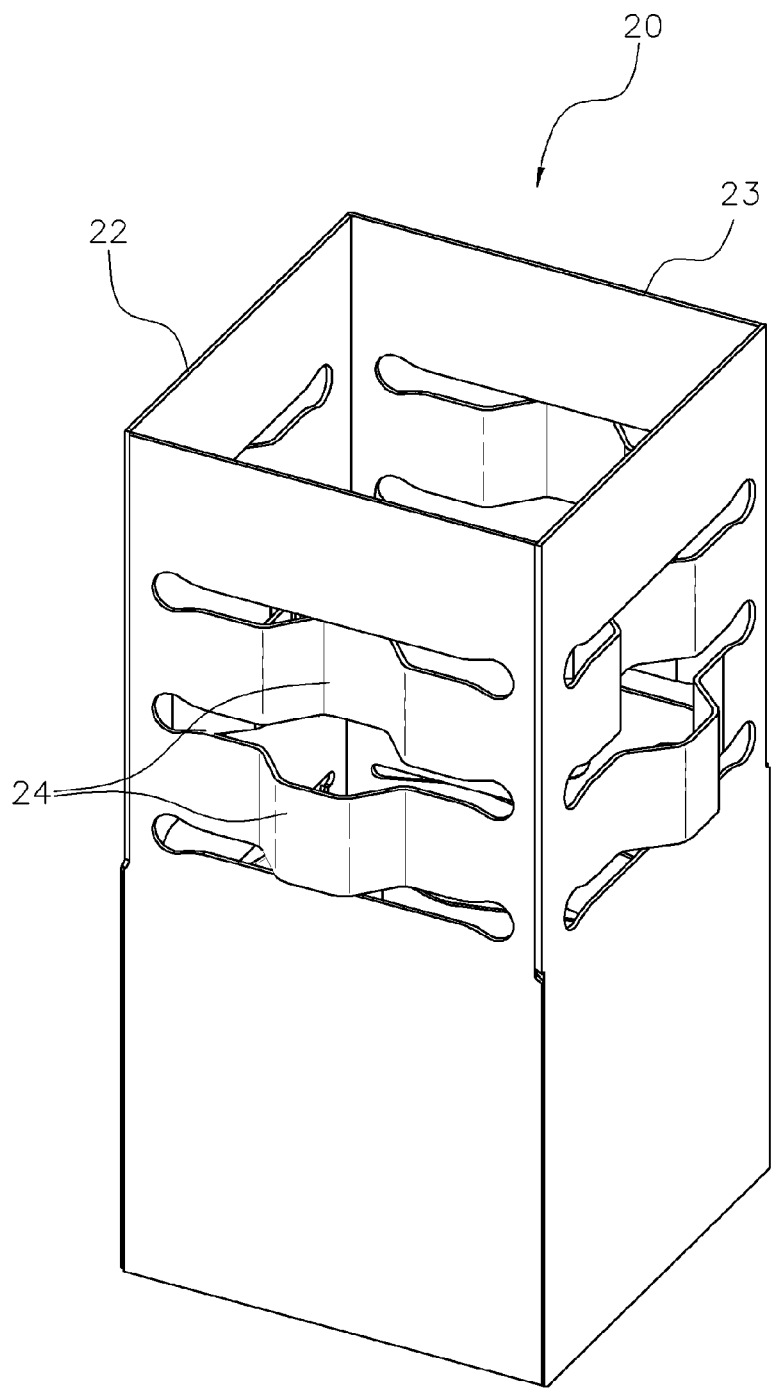
FIG. 3 is a perspective view showing a spacer grid, according to a conventional technique.
Figure 4A:
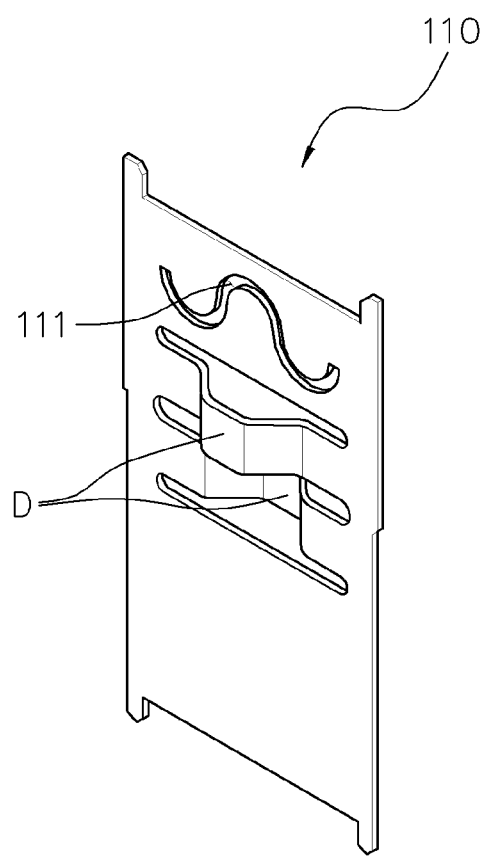
FIGS. 4A and 4B are views illustrating a spacer grid of a nuclear fuel assembly according to the present invention.
Figure 4B:
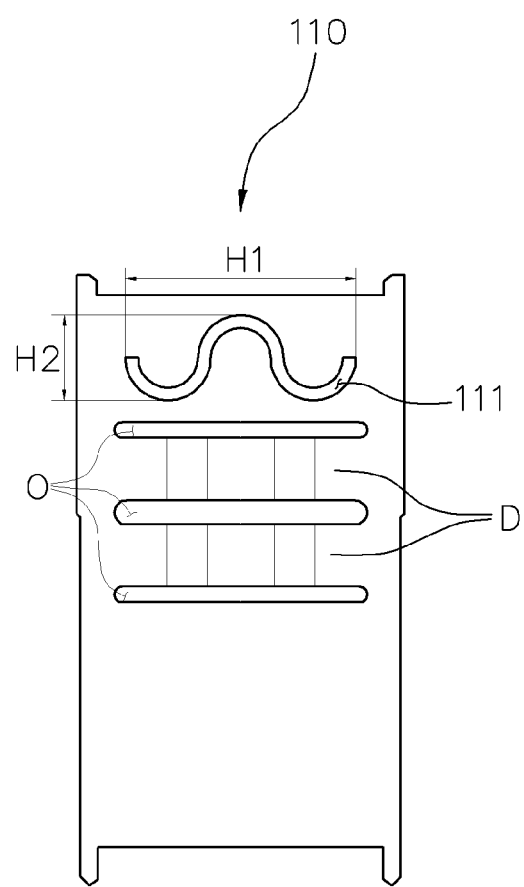
Figure 5A:
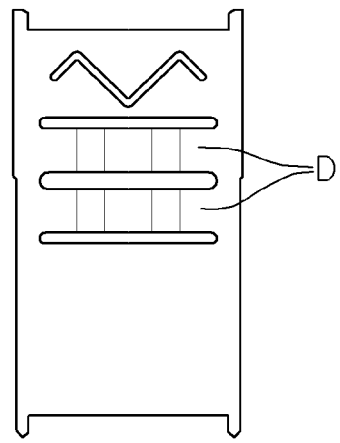
FIGS. 5A through 5G are front views showing other embodiments of the spacer grid according to the present invention.
Figure 5B:
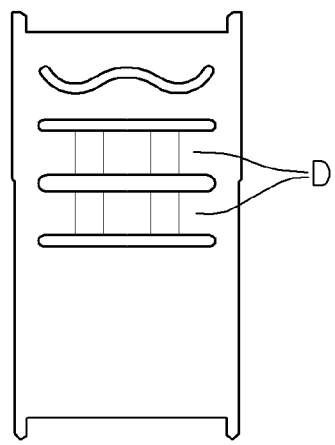
Figure 5C:
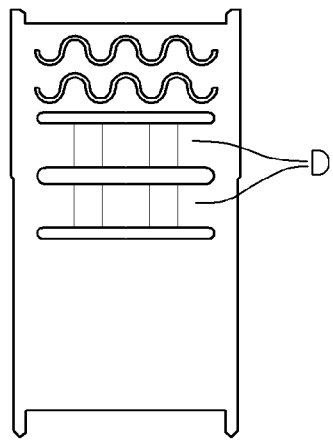
Figure 5D:
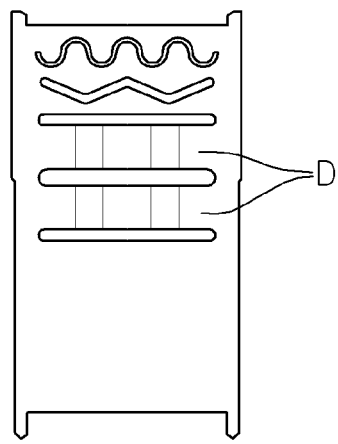
Figure 5E:
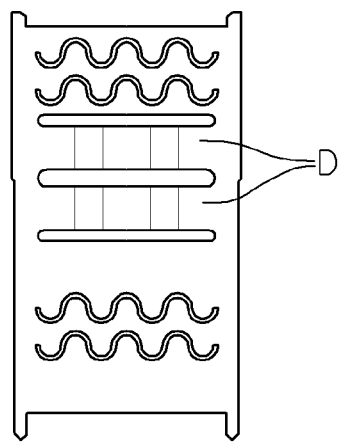
Figure 5F:
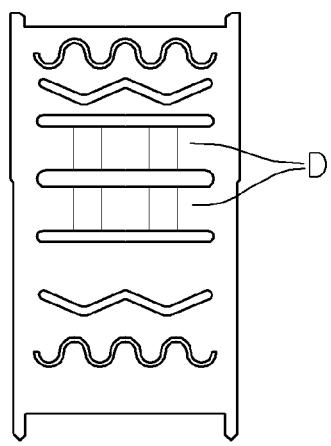
Figure 5G:
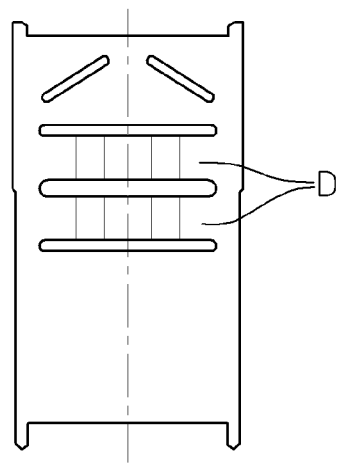

FIGS. 4A and 4B are views illustrating a spacer grid of a nuclear fuel assembly according to the present invention. FIG. 4A is a perspective view showing only one of grid strips that forms a single lattice cell in the spacer grid. FIG. 4B is a front view of the grid strip of FIG. 4A.

Referring to FIGS. 4A and 4B, the spacer grid for a nuclear fuel assembly according to the present invention includes a plurality of grid strips which are assembled in a lattice shape and form lattice cells in which fuel rods are disposed, in the same manner as the conventional technique.

As shown in FIGS. 4A and 4B, dimples D for supporting a fuel rod are provided in a grid strip 110. It will be obviously understood by the structure of the typical spacer grid for a nuclear fuel assembly that a grid spring may be integrally provided on the grid strip 110.

Preferably, the spacer grid of the present invention is technically characterized in that at least one elongated slot 111 is formed in a planar portion of the grid strip 110 separately from the dimples D or grid spring. Each dimple D is configured such that it bends and protrudes in an arc-shape from the grid strip 110 inwards or outwards based on the corresponding lattice cell. Here, although cutting slits O are formed adjacent to the dimples D (or the grid springs) in the grid strip 110, the elongated slot 111 is independent of the cutting slits O that pertain to the dimples or the grid springs. In other words, it must be understood that the elongated slot 111 is formed in the planar surface of the grid strip 110 regardless of the dimples D or the grid springs.

As shown in FIGS. 4A and 4B, the elongated slot 111 may be formed in a planar portion of the grid strip 110 above the dimples D in a curved shape of a predetermined length H1 and a vertical amplitude H2.

In the present invention, a variety of modifications of the elongated slot are possible.

As shown in different examples of FIGS. 5A through 5G, the shape of the elongated slot formed in the grid strip may be that of a saw tooth wave (5A) that is bent several times, or a curved line (5B) of a small vertical amplitude. Alternatively, the elongated slot may comprise two or more elongated slots (5C) of the same pattern, a combination of two or more elongated slots (5D) of different patterns, two or more elongated slots (5E) of the same pattern which are formed in each of planar surfaces above and below the dimples D, or a combination of two or more elongated slots (5F) of different patterns which are formed in each of planar surfaces above and below the dimples D. As a further alternative, the elongated slot may comprise two or more slots (5G) which are arranged to be vertically symmetrical.

As such, because the elongated slots are formed in the grid strips 101 that form the spacer grid, characteristics of vibration of the spacer grid can be set in a variety of ways, thus reducing flow-induced high-frequency vibration.

Furthermore, in the present invention, the position, size or shape of the slot formed in the grid strip can be variously modified without reducing the structural strength of the grid strip.

As described above, a spacer grid for a nuclear fuel assembly according to the present invention includes dimples or grid springs which support fuel rods. At least one elongated slot is formed in a planar surface of each of grid strips of the spacer grid regardless of the dimples or springs. Thus, characteristics of the vibration of the spacer grid can be set in a variety of different manners by modifying the position, size, shape, etc. of the slot(s) so that flow-induced high-frequency vibration can be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spacer grid for a nuclear fuel assembly, the spacer grid comprising:
    a plurality of grid strips assembled in a lattice pattern; and
    a plurality of grid cells formed by the plurality of grid strips,
        wherein a section of each of the grid strips, corresponding to each grid cell of the plurality of grid cells, includes
            a dimple supporting a fuel rod and having slits formed in a lateral direction perpendicular to the fuel rod and arc-shape portions protruding inwards or outwards between the slits, and
            at least one set of slots formed entirely in a planar surface of the section separately from the slits surrounding the dimple and having at least one of a wave shape, a saw tooth shape and a slanted line shape extending in the lateral direction along the slits of the dimple, said at least one set of slots including a first slot disposed in an upper position of the section above and apart from the dimple and a second slot disposed in a lower position of the section below and apart from the dimple,
        wherein said at least one set of slots is provided for reducing flow-induced high-frequency vibration of the spacer grid.

2. The spacer grid as set forth in claim 1, wherein the first slot and the second slot have the same shape each other.

3. The spacer grid as set forth in claim 1, wherein the first slot and the second slot have different shapes each other.

4. The spacer grid as set forth in claim 1, wherein the first slot and the second slot are vertically symmetric with respect to an imaginary center line of the section.

5. The spacer grid as set forth in claim 1, wherein the at least one set of slots further includes a third slot disposed in the upper position of the section apart from the dimple and a fourth slot disposed in the lower position of the section apart from the dimple.

6. The spacer grid as set forth in claim 5, wherein the third slot and the fourth slot have the same shape each other.

7. The spacer grid as set forth in claim 5, wherein the third slot and the fourth slot have different shapes each other.

8. The spacer grid as set forth in claim 5, wherein the third slot and the fourth slot are vertically symmetric with respect to an imaginary center line of the section.

\* \* \* \* \*